(12) United States Patent
Feagans

(10) Patent No.: US 6,366,297 B1
(45) Date of Patent: Apr. 2, 2002

(54) SYSTEM AND METHOD FOR DISPLAYING MODEM INFORMATION ON A GRAPHICAL USER INTERFACE DISPLAY

(75) Inventor: Raymond J. Feagans, Nevada City, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/260,150

(22) Filed: Mar. 1, 1999

(51) Int. Cl.[7] .................................................. G09G 5/00
(52) U.S. Cl. ....................... 345/736; 345/705; 345/714; 709/217; 709/224; 709/301
(58) Field of Search ................................. 345/705, 714, 345/706, 707, 708, 709, 710, 711, 712, 713, 736; 709/107, 206, 217, 223, 224, 250, 301; 710/15, 19; 714/32

(56) References Cited

U.S. PATENT DOCUMENTS 5,367,667 A * 11/1994 Wahlquist et al. ............ 714/32
5,852,746 A * 12/1998 Barrett ......................... 710/19

* cited by examiner

Primary Examiner—Ba Huynh
(74) Attorney, Agent, or Firm—McDonnell Boehnen Hulbert & Berghoff

(57) ABSTRACT

A system and method for displaying information from a device on a display screen using application screens generated by a graphical user interface. Device commands that request information about the device are received by the device driver that provides an interface to the device. The device driver interprets the device command using a device command task and calls an application caller to start an application that displays an application screen containing the information requested by the device command. In one embodiment, a modem help command is entered by the user at a command line of a terminal application. The device command task calls the application caller to start the help system application to display the modem help information on an application screen generated from the graphical user interface.

20 Claims, 10 Drawing Sheets

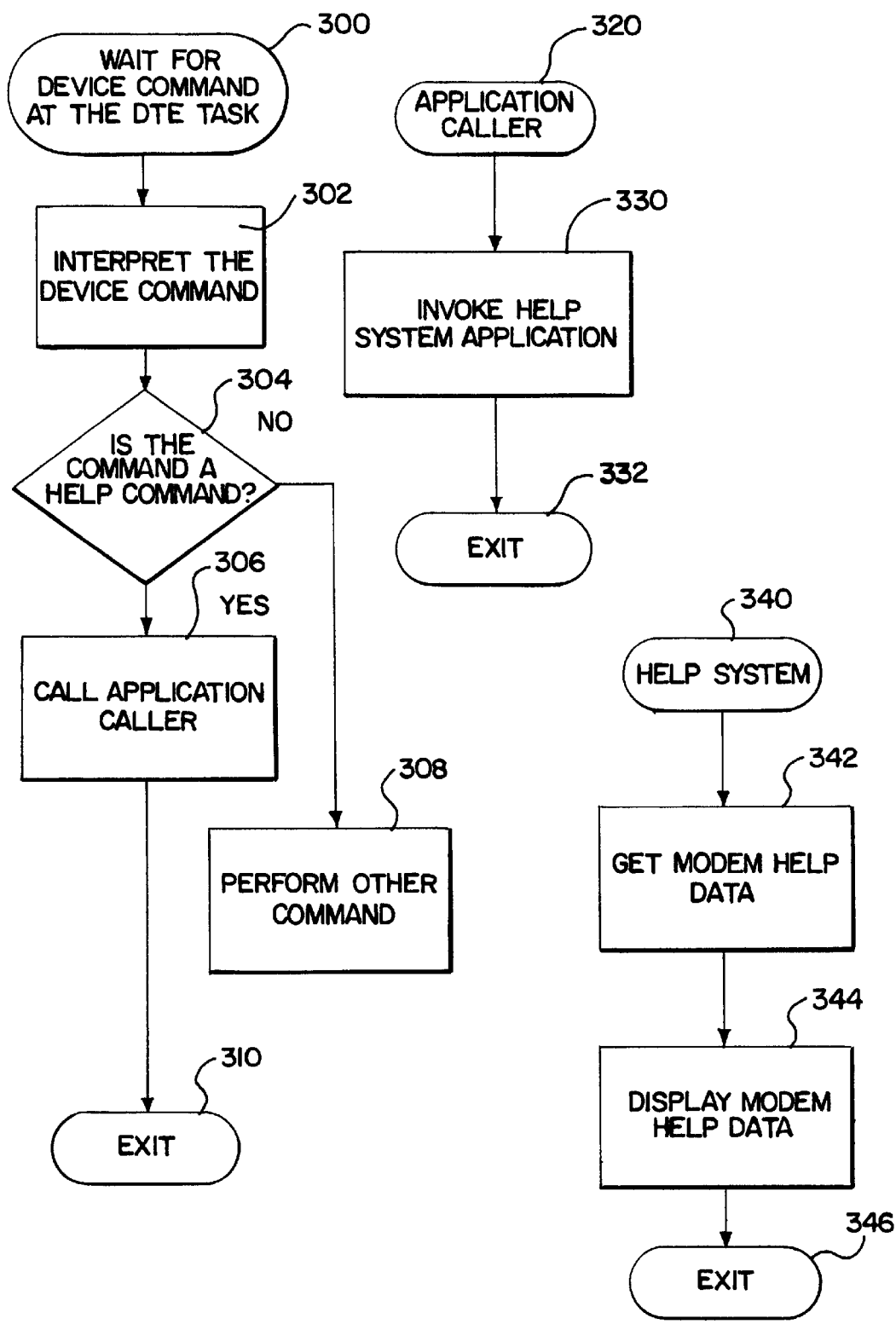

FIG.5

```
//FROM AT$ SECTION
CHAR ATDOLLAR(VOID)
{
#IF DTELOG_ON
ISF_PRINTF ("ATDOLLAR ENTERED\N");    410a
#ENDIF
    (*VXD_SRV_TABLE->STARHELPAPP) (1);
    RETURN AT-SUCCESS;

//FROM ATD$ SECTION
CHAR ATDIAL(VOID)
{
#IF DTELOG_ON
ISF_PRINTF("ATDIAL ENTERED\N");
#ENDIF

ISF_TMBMSG MSG;
BYTE SZCRLF[3];

SZCRLF[0] = CONF.GETCRCODE();
    SZCRLF[1] = CONF.GETLFCODE();
    SZCRLF[2] = NULL;

// FIRST, CHECK IF DIAL HELP IS REQUESTED...
    IF(*ATCMD.PCHATSTR == '$')
        { ATCMD.PCHATSTR++;                  410b
          (*VXD_SRV_TABLE->STARHELPAPP) (4);
          RETURN AT_SUCCESS;
}
//FROM ATS$ SECTION              410c
CASE '$'  :
        (*VXD_SRV_TABLE->STARTHELPAPP) (3);
        ATCMD.BPARSEMORE = TRUE;
        BREAK;
/*
** ATAMPDOLLAR
*
*  PARAMETERS:
*
*  DESCRIPTION:   EXTENDED AMPERSAND HELP REQUEST
*
*  RETURNS:
*
*/
CHAR ATAMPDOLLAR(VOID)
{                                  410c
    (*VXD_SRV_TABLE->STARTHELPAPP) (2);
    RETURN AT_SUCCESS;
}
//FROM RING 3 IMPLEMENTATION
VOID STARTHELPAPP(INT DATA)

WINHELP(NULL, ""GVADWMDM.HLP", 1, (ULONG)DATA);
}
```

FIG. 5 cont.

```
// FROM RING O IMPLEMENTATION
TYPEDEF STRUCT
{
    INT (*GETFROMOUTBUL) (PCHAR, DWORD);
    INT (*PUTTOINBUF)         (PCHAR CPTR, DWORD SIZE);
    VOID (*STARHELPAPP)  (INT);
    VOID (*MODEMSTATUS)       (DWORD, INT);

// FROM THE VXD                    420
VOID STARTHELPAPP(INT DATA)
{
    HELPARGS.DWDATA=DATA;                                       404
    HELP_EVENT.SCHEDULE( );    430
}

MYAPPYEVENTHELP_EVENT;              440
STRUCT
{
    DWORD DWDATA;      //ADDITIONAL DATA DEPENDING ON TYPE
    WORD UCOMMAND;     //TYPE OF HELP
         DWORD SZHELPFILE;    //ADDRESS OF DIRECTORY PATH STRING
    WORD HWNDMAIN;     //HANDLE OF WINDOW REQUESTING HELP
}HELPARGS;

//THIS CODE SCHEDULES ANY APPYTIME EVENT FROM RING O
MYAPPYEVENT::MYAPPYEVENT() : VAPPYTIMEEVENT(O) {}

//THIS IS THE CODE WHICH IS CALLED AT APPLICATION TIME
#INCLUDE PAGEABLE_CODE_SEGMENT

VOID MYAPPYEVENT::HANDLER(PVOID REF, DWORD FLAGS)

PVOID LA;

HELPARGS.HWNDMAIN=NULL
    HELPARGS.SZHELPFILE=LOCALALLOC(LMEM_STRING, O, LA, "GVADWMDM.HLP");
    HELPARGS.UCOMMAND=I; //TYPE I IS TOPIC, TYPE II IS CONTENTS
//  HELPARGS.DWDATA=I;   //HELP TOPIC FOR UCOMMAND=I.O FOR COMMAND=II

CALLDLL("USER", "WINHELP", SIZEOF(HELPARGS), &HELPARGS);

LOCALFREE(HELPARGS.SZHELPFILE);
```

FIG. 6D

```
USR-HYPERTERMINAL
FILE EDIT VIEW CALL TRANSFER HELP

AT$
HELP,   COMMAND QUICK REFERENCE (CTRL-S TO STOP, CTRL-C TO CANCEL)

#$      HELP, OCTOTHORPE COMMANDS              Kn    n=0   CALL DURATION MODE
&$      HELP, AMPERSAND COMMANDS                     n=1   REAL TIME CLOCK MODE
%$      HELP, PERCENT COMMANDS                 Mn    n=0   SPEAKER OFF
A/      REPEAT LAST COMMAND                          n=1   SPEAKER ON UNTIL CD
A       CONTINUOUSLY REPEAT COMMAND                  n=2   SPEAKER ALWAYS ON
AT      COMMAND MODE PREFIX                          n=3   SPEAKER OFF DURING DIAL
A       ANSWER CALL                            ON          RETURN ONLINE
Bn      n=0  V.32 ORIGINATE MODE                     n=1   RETURN ONLINE & RETRAIN
        n=1  HST ORIGINATE MODE                      n=2   RETURN ONLINE & SPEED SHIFT
Cn      n=0  TRANSMITTER OFF                  P            PULSE DIAL
        n=1  TRANSMITTER ON                   Qn     n=0   RESULT CODES SENT
Dn      DIAL A TELEPHONE NUMBER                      n=1   QUIET (NO RESULT CODES)
        n=0..9*#TPR,;"Wq!()-                         n=2   VERBOSE/QUIET ON ANSWER
DL      DIAL LAST PHONE NUMBER                Sr=n         SETS REGISTER "r" TO "n"
DSn     DIAL STORED PHONE NUMBER              Sr?          QUERY REGISTER "r"
D$      HELP, DIAL COMMANDS                   S$           HELP, S REGISTERS
En      n=0  NO COMMAND ECHO                  T            TONE DIAL
        n=1  ECHO COMMAND CHARS               Vn     n=0   NUMERIC RESPONSES
Fn      n=0  ONLINE ECHO                             n=1   VERBAL RESPONSES
STRIKE A KEY WHEN READY....
```

SYSTEM AND METHOD FOR DISPLAYING MODEM INFORMATION ON A GRAPHICAL USER INTERFACE DISPLAY

BACKGROUND OF THE INVENTION

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever.

A. Field of the Invention

The present invention relates to the field of data communications devices, and more specifically, to the field of accessing information from a communications device.

B. Description of the Related Art

Modems typically operate in a data mode or in a command mode. In the data mode, a modem communicates data between a program executing on a local computer and a remote computer. In the command mode, the modem receives and executes commands for configuring the modem or for retrieving information about the modem. The modem may receive commands to send and to receive data in the command mode. Once the modem is in the data mode, however, it cannot receive and process commands unless the user switches the modem back to the command mode.

The commands performed by the modem include requests for information such as the modem speed, error correction mode, parity setting, the condition of the line, the number of bytes sent/received, and other information related to the status of the operation of the modem. Such information is dynamic in that it reflects the status of the modem at any given time. In executing dynamic commands, the modems typically retrieve information from data registers, from random-access memory (RAM) in the modem architecture or from programs that monitor the state of the modem.

Modems may also include commands that provide static information. Static information is typically information about the particular model or version of the modem. For example, modems typically include a 'help' command that provides the user with information about how to use the modem. The help command may describe the operating modes of the modem (e.g. data mode, command mode), the syntax and function of its commands, the description of any diagnostic messages, and the description of any error messages. Other commands for static information may include commands that display the modem model of the modem, the version number of the modem, the features supported, and other static information. Static information is typically retrieved from the modem's firmware, or read-only memory area.

Early modems were used in computers having either no graphical user interfaces or graphical interfaces with limited capability. The modems enabled the computer to function in terminal mode. The computer was a terminal for an application that was executing at a remote location. In this manner, applications were shared by allowing multiple users to access a central computing resource.

In terminal mode, the user establishes the connection to the application by dialing the telephone number to the remote application using a dial command (e.g. ATDT phone number) and connecting to a remote modem at the remote location. Once the connection between the local modem and remote modem is established, the user accesses the remote application by calling commands to invoke the application to execute on the remote location. The user enters user input at the computer keyboard. The user input is displayed on the computer screen at a command line, or a command prompt, at a line on the computer screen having a cursor or other marker, for input.

The modem sends the user input to the remote application executing at the remote location. The remote application receives the user input and communicates any response data to the computer. The modem receives the data and sends it to the computer for display on the computer display screen. The computer displays text received from the modem starting at the location of the cursor on the screen. The data is formatted as ASCII characters, which allowed for page formatting with codes that changed the position of the cursor, such as, line feed, page break, cursor home, etc.

When the modem is connected to the computer as a terminal, the user is able to switch between data mode and command mode. Modems typically include a mode switch command that switches between one mode to the other. For example, in some modems, the user may enter "+++" at the terminal while the modem is online to interrupt the data mode online state and to take the modem to an online command mode. In the online command mode, the modem will receive and execute commands. The user may then enter an "ATO" command to the modem to cause it to go back to data mode on-line.

Computers may still use the modems to operate in terminal mode. However, the connections between computers using modems have become more sophisticated. Modems are now widely used with computers having a graphical user interface. Applications that connect to remote locations may use the modem through layers of software such as, a device driver, various protocol drivers and the operating system I/O system. In addition, the applications that use the modem typically use one or more "windows" or application screens within the display screens to display data received from the remote location. Terminal applications are available to provide a command line interface. The use of such applications has decreased however, as remote applications now provide data formats capable of displaying graphics. For example, web browsers have a graphical user interface that can be used through a modem to communicate with remote applications over the Internet.

Applications with graphical user interfaces may use modems in command mode by sending a mode switch command and sending modem commands through a modem driver interface. The user may also use the modem in command mode through a terminal application. The information commands however, display modem information on the computer screen in a terminal mode using the computer display screen as the terminal display. The information is stored in read-only memory on the device and accessed during the execution of a static information request. Even with a graphical user interface, limitations imposed by the system hierarchy employed in typical commercially available computers exist in the way the static information is stored and displayed on the terminal display.

The static information request is executed by the modem driver, which typically executes at a low level in the system hierarchy. In a typical computer, the operating system provides high-level user-type programs with access to low-level system resources that may access the hardware. The operating system includes system calls, or driver interfaces that are used in high-level programs to access the low-level resources. The low-level resources, however, do not include access to one another. For example, a modem driver cannot include a call to a disk driver thereby forming a barrier between the modem driver and an otherwise desirable way to store static information. Therefore, static information requests access information that is stored by the driver in non-volatile memory.

The system hierarchy used in the computer also limits the manner in which the modem driver displays static information. Because drivers cannot access other drivers directly, the modem driver cannot open an application screen in a graphical user interface. Application screens are generally treated as devices that must be opened with a device name using resources of the operating system. Because such resources are not available to the modem driver, the static information displayed in response to a static information request is typically displayed on an existing application screen using the device name provided in the system call to the modem driver. The device name identifies the application screen used by the terminal application in which the command was entered. The static information is displayed from the top of the terminal application screen usually overwriting other information on the screen.

The information displayed in this way is difficult to understand since the modem outputs the data while running over other data already on the display screen. In addition, the information is not persistent. Subsequent commands that output to the display overwrite the information displayed from the static information request. It would be desirable for modems to display static information in an easy to read, persistent display using graphical user interface resources.

One problem with having the static information in read-only memory, such as firmware, in the modem device is that it is difficult to configure for different languages. Physically different devices must be made available for each different language used for the static information.

Modem modems known as Winmodems and Softmodems™, now perform many of the functions of the modems in software, leaving only basic functions such as those of the coder/decoder (codec) in the hardware. While such added emphasis on using software to perform modem functions such as the processing of commands in terminal mode, static information nevertheless remains stored in non-volatile memory and its display is still non-persistent and difficult to read. Modem drivers remain subject to the hierarchy of computer systems.

In modem operating systems, however, a further barrier exists in that operating systems operate using different privilege levels. Such privilege levels typically include a kernel level in which operating system resources and hardware drivers execute and a user level in which applications such as word processors, email, browsers and terminal applications execute. The different privilege levels take advantage of privilege modes provided by modem processors. The use of different privilege levels in known modems further isolate the modem driver from access to resources that would permit the display of static information in easy to read and persistent displays.

Another problem with known devices is that changes to versions of the device driver may change the way commands are used by the user. Yet the user would not be made aware of the change using, for example, a help command. The information in the firmware would remain unchanged unless the modem device was changed as well. Such firmware changes are expensive to the manufacturer and inconvenient to the user. It would be desirable for the manufacturer to be able to ship products having information in different languages without requiring unique devices for each language.

Presently, requests for static information such as the help command may only be used when in command mode and connected to a terminal application. When the modem is in data mode, the static information, like most modem commands are unavailable to the user.

It would be desirable to be able to access modem static information, and to execute other information request commands while the modem is communicating data.

SUMMARY OF THE INVENTION

In view of the above, a system in a computer is provided for displaying information from a device on a display screen using graphical user interface objects. The system includes a multitasking operating system for providing computing resources to application programs. The multitasking operating system has a scheduler and a graphical user interface. The scheduler schedules a plurality of tasks for execution using the multitasking operating system. The graphical user interface displays a plurality of application screens on the display screen.

A device interface is included for providing a program access to the device. A first application sends a device data request to the device interface for requesting device data for display on the display screen. A device driver coupled to the device interface receives the device data request from the first application. The device driver is coupled to a device command task for processing a plurality of device commands including the device data request. A second application is called by the device command task in response to the device data request. The second application sends the device data to one of the plurality of application screens.

In a further aspect of the present invention, a method is provided in a system having a device connected to a computer. The computer includes a multitasking operating system having a scheduler for scheduling tasks, a driver interface for providing access to the device, and a graphical user interface to display a plurality of application screens on a display screen. According to the method, a device command is received at a first application, the device command being a request for device information. The device command is sent via the driver interface to a device command task. The command is interpreted at the device command task. A second application is called at the device command task in accordance with the interpreting step of the device command task. The second application displays an application screen related to the device command. The second application retrieves and display device data in response to the device command.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 4 is a flowchart showing an example of a method according to a preferred embodiment of the present invention;

FIG. 5 shows examples of computer program code for performing selected calls in FIGS. 2 & 3; and FIGS. 6A–6D show examples of help screens displayed using the system in FIG. 1 and a help screen displayed by known modems.

DETAILED DESCRIPTION OF THE PREFERRED EMBODIMENT

Figure 1:
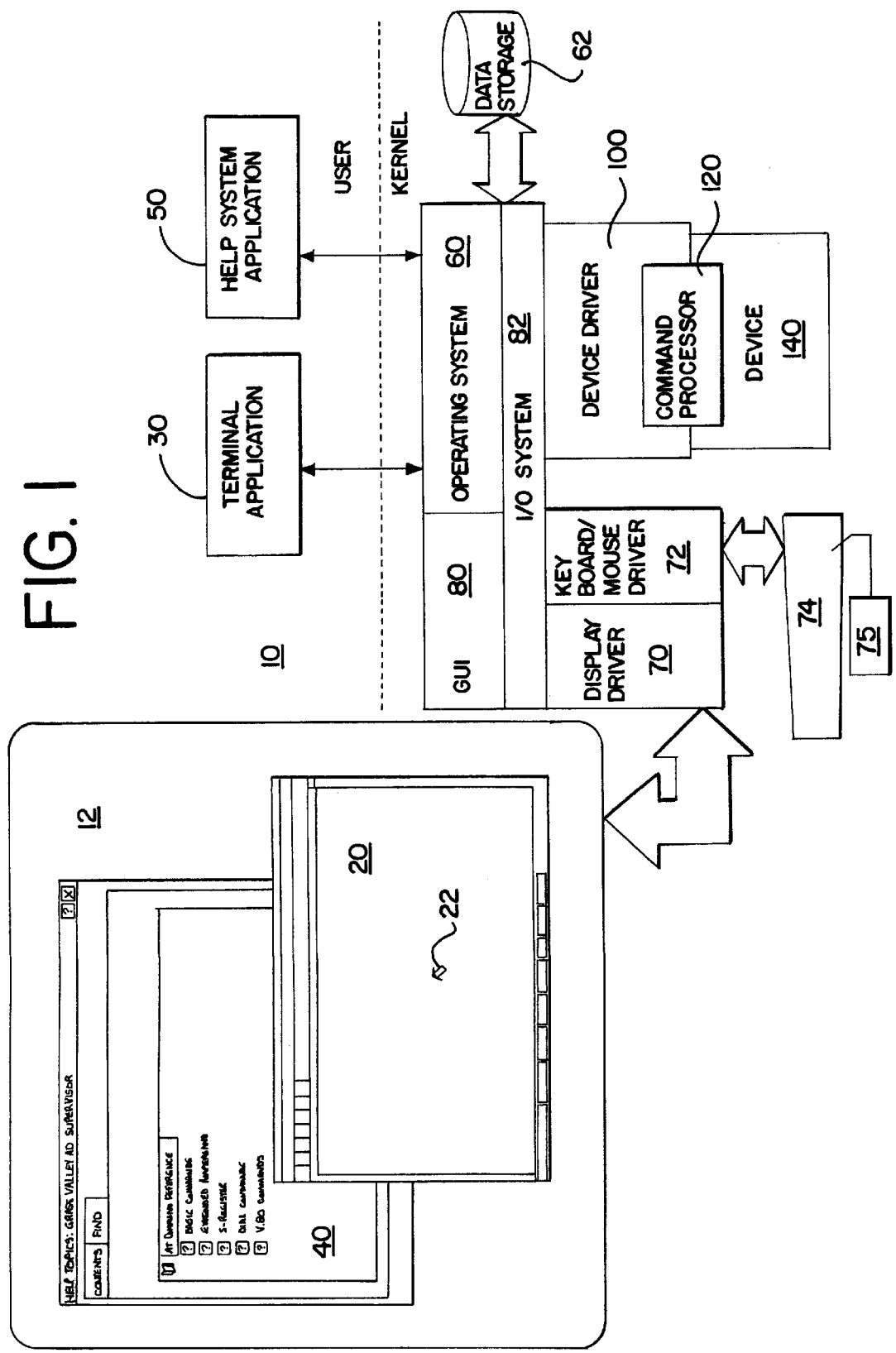
FIG. 1 is block diagram of a computer having a system for displaying device information on an application screen using graphical user interface objects.

FIG. 1 shows a system 10 for displaying information relating to a device 140 on a display screen 12 according to a preferred embodiment of the present invention. The system 10 operates on a computer having an operating system 60, a data storage system 62, a graphical user interface 80, and an I/O system 82. The operating system 60, the data storage system 62, the graphical user interface 80 and I/O system 82 provide resources to applications such as the first application 30 and the second application 50.

The first and second applications 30, 50 also use, as resources, user interface devices such as, the display screen 12, a keyboard 74 and a point and click device 75 (e.g. a mouse). The display screen 12 is accessed using a display driver 70. The keyboard 74 and mouse 75 are accessed using a keyboard/mouse driver 72. The system 10 includes the device 140 and a device driver 100 for controlling the device 140 from programs executing on the computer.

The operating system 60 is preferably a commercially available and robust operating system capable of multi-tasking and having the graphical user interface 80 and the I/O system 82 included. In a preferred embodiment, the operating system 60 is a Microsoft Windows™ operating system. The operating system 60 includes an interface using system calls and data structure definitions to enable a user to have access to the system resources.

The operating system 60 preferably operates using different privilege levels. Such an operating system 60 typically includes a kernel level in which operating system resources execute and a user level in which applications such as word processors, email, browsers and terminal applications execute. The different privilege levels take advantage of privilege modes provided by modem processors. For example, versions of Windows™ after Windows 3.1™ and versions of Windows NT and later employ an architecture partitioned in rings to take advantage of the X86 architecture utilization of privilege modes in four rings. Most operating systems use only two of the rings; the kernel mode operates in Ring 0 and the user mode operates in Ring 3. The device driver 100 operates along with other hardware drivers in the kernel level. The first and second applications 30, 50 operate in the user level and access the device driver 100 using Application Programming Interfaces (APIs) available in the operating system 60.

The I/O system 82 includes hardware and software components such as APIs for invoking drivers to control devices. In a preferred embodiment, the I/O system 82 includes a standard driver interface system that provides standard procedures and tools for invoking drivers from any program in the system. One example of such a standard interface system is the Virtual Device Driver (VxD) interface system available for the Windows™ operating system.

For purposes of the following description, the I/O system 82 also includes one or more protocol drivers for executing protocols available in the industry for using the devices connected to the I/O system 82. For example, the device 140 may include a modem controlled by a modem driver that is invoked by protocol drivers that perform functions conforming to communications protocols, such as the Point-to-Point Protocol (PPP), the Transport Control Protocol (TCP), and the Internet Protocol (IP). The protocol drivers in the I/O system 82 enable the computer to include applications such as a browser for accessing web sites on the World Wide Web and to communicate email over the Internet.

Applications executing on the computer typically invoke user interface device drivers via the graphical user interface 80 using graphical user interface objects such as buttons, drop-down menus, pop-up menus, application screens, etc. Graphical user interface objects invoke the keyboard/mouse driver 72 and the display driver 70 in particular. However, a button, for example, may be programmed to invoke a modem driver to initiate a connection to a remote location via a modem. Similarly, the modem driver may send data received from the remote location to an application screen.

FIG. 1 shows a first application screen 20 and a second application screen 40 for displaying information relating to the corresponding first and second applications that may operate on the computer. In a preferred embodiment, the first application 30 is a terminal application for enabling the computer to operate in terminal mode. In terminal mode, the computer enables the user to access the device 140 directly thereby enabling the user to enter device commands and receive feedback. Device commands are commands that are provided for execution by the device driver 100 to control the device 140 or to retrieve information from the device 140.

The device driver 100 and the device 140 include a command processor 120 for processing the commands received by the device driver. The command processor may include a general processor on the device itself or merely an interface to the general processing resources on the computer 10. The command processor 120 may also include the use of a combination of the two processor resources.

Device commands are typically invoked by programs in applications operating in the user level. For example, a modem driver includes commands for sending/receiving data, setting error control modes, etc. Similarly, a driver for a disk drive includes commands for reading from the disk, writing to the disk, etc. One of ordinary skill in the art will appreciate that any device 140 may include device commands for performing the functions of the device. Such commands are typically invoked under program control when the device operates in data mode. However, the terminal application 30 provides the user with the ability to invoke the commands directly, when the device operates in a command mode.

One advantage of using the terminal application 30 to control the device is that it enables the user to obtain information about the device 140 directly using device commands that are device data requests. For example, the device 140 and the device driver 100 may include a help command that explains how all of the device commands of the device 140 may be used. Other commands include commands that access the status of the device 140, the state of selected registers, the version of the device, etc. The terminal application 130 typically includes a command line 22 on the first application screen 20 at which the user may enter commands via the keyboard 74.

The device commands, or device data requests that access information such as the version of the device or the help information for using the device are commands that access static information. Static information is information that doesn't change for a given device 140. For example, the response to a help command is always the same output. Static information in known devices is typically stored in non-volatile memory, such as flash memory or electrically erasable programmable read-only memory. During a request for static information, the device driver 100 reads the information from non-volatile memory and outputs it to the display screen 12. One advantage of embodiments of the present invention is that static information may be stored in a data structure or a file in the computer data storage 62. In addition, the static information may be stored in a variety of languages. The device driver 100 may be configured at initialization to request that the user select a language in which to display the static information.

Dynamic information includes information that may change during the use of the device. For example, a request for status indicators, such as status registers, or mode settings may yield different results at different times. Dynamic information is retrieved from the device 140 or from the device driver 100. Embodiments of the present invention advantageously permit dynamic information to be displayed using a graphical user interface object using device data requests for dynamic information.

Table 1 shows an example of device commands that may be defined for a modem.

TABLE 1

Examples of Modem Commands

1. Show TX/RX byte count
2. Display TX/RX throughput (includes compression)
3. Provide the reason why the application failed to open the COM port
4. Animate auto answer On/Off LED
5. Provide remote modem identification and capabilities
6. List local modem features supported
7. Display modem firmware version
8. Display data pump type
9. Answer whether modem is upgradable to next standard
10. Indicate ARQ TX/RX errors
11. Illustrate line quality (SNR)
12. Provide connection modulation type
13. Indicate retrain count
14. Display user help information
15. Display currently configured fax class and fax classes supported.
16. Display time the device spent waiting for information from the remote side of the connection
17. Indicate whether modem has reached V.90 speeds
18. Provide active networking protocol (PPP, TCP/IP, SLIP, etc.)
19. List current & mean TX/RX data rate
20. List current & mean TX/RX compression ratio
21. Indicate power save mode (sleep, deep sleep, full power)
22. Display symbol rate
23. Display TX/RX power levels
24. Provide current error protocol type
25. Provide current compression Type
26. List current ARQ (Acknowledge/Request protocol) Type
27. Provide eye pattern data One problem with known devices 140 and device drivers 100 is that the output provided in response to device commands requesting information relating to the device is a general display or printer port that may merely outputs the information on the display screen 12. At best, the calling program will supply a device or port name to which to output the information for display on an application screen. The device driver 100 outputs the information to the display screen 12 instead of to a specific application screen. The information overwrites any information that may have already been on the display screen 12 resulting in a disorganized and un-readable display, particularly when the computer uses a graphical user interface.

The advantage of the present invention is that the information output in response to a device command is instead output to an application screen, such as the second application screen 40 that corresponds to a second application 50. The function of the second application 50 is to display the requested information using graphical user interface tools. The information is therefore persistent; even if it scrolls off the screen, the user may manipulate a sidebar to view the information that has scrolled off.

In a preferred embodiment, the second application 50 is help system provided as part of the computer program resources to communicate information that helps the user to make better use of the computer. For example, the Windows™ operating system includes a help application 50 that the user may use to display help information in the second application screen 40. The information displayed on the second application screen 40 is displayed in a more readable format and may include buttons and other graphical user interface objects for accessing more information in a logical manner.

In accordance with embodiments of the present invention, the second application 50 may be called in response to a device command that requests the display of static information (i.e. Help information) using a device command task. The device command task uses an application caller to invoke the second application 50.

Figure 2:
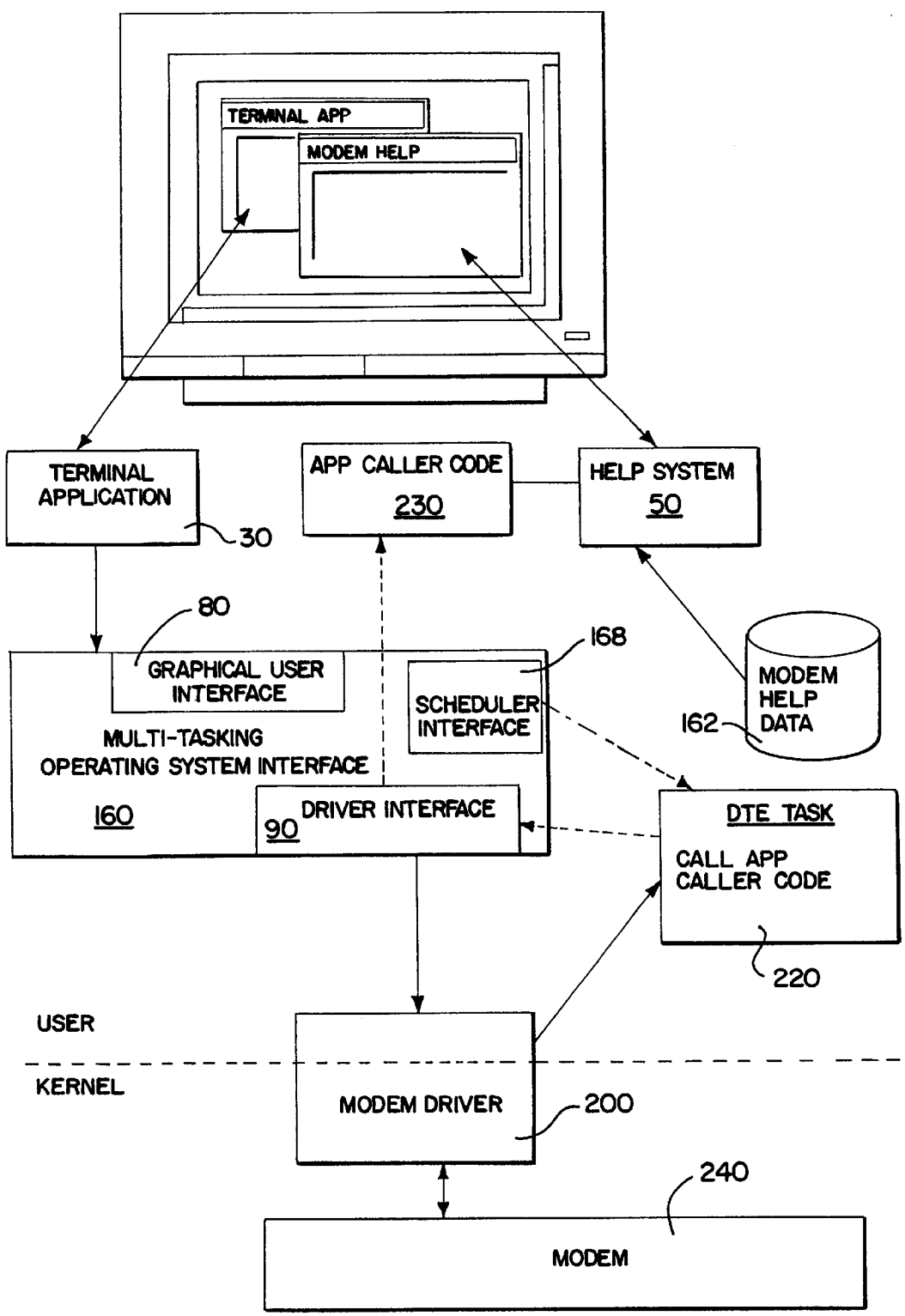
FIG. 2 is a block diagram of a preferred embodiment of the present invention.

FIG. 2 shows a block diagram of an example of the system shown in FIG. 1 according to a preferred embodiment of the present invention. The block diagram in FIG. 2 shows the terminal application 30 coupled to the first application screen 20, the help system application 50 coupled to the second application screen 40, a multi-tasking operating system interface 160, a modem driver 200, and a modem 240. The multitasking operating system interface 160 in FIG. 2 includes a graphical user interface 80, a scheduler interface 70 and a driver interface 90. User level programs access the modem driver 200 through the driver interface 90. The driver interface 90 provides a standard interface, or system for accessing device drivers such as the modem driver 200, in the same way regardless of the device that is being used. Examples of the driver interface 90 using the Windows™ operating system includes Application Programming Interface (API) tools such as the Virtual Device Driver interface (VxD). In alternative embodiments, a dynamic link library may also be used as the driver interface 90.

The scheduler interface 70 provides system calls and other resources for scheduling the execution of tasks using the multi-tasking operating system. A task is a program element or structure for organizing computer programs for execution. Programs at a user level typically operate within a task. Many tasks may wait in a queue and execute at any given time by sharing processor resources. A scheduler (not shown) operating in the kernel designates selected tasks to execute according to a scheme. For example, tasks may be scheduled to execute according to pre-designated priorities, dynamic priorities, first-in-first-out queues, or other preemptive schemes known to those of ordinary skill in the art. Typically, the scheduler selects tasks to execute whenever a system call to the operating system is made.

The modem driver 200 includes a data terminal equipment (DTE) task 220 for performing commands in terminal mode. The modem driver 200 in FIG. 2 preferably schedules the DTE task 220 to execute in user mode. The modem driver 200 may schedule tasks to execute in user mode using dynamic link libraries that include calls and data structures that provide access to the resources of the multi-tasking operating system. Further information regarding the execution of driver level software in user mode may be found in "Software Architecture For Providing Low Level Hardware Device Drivers From The User Mode Under Multi-Tasking Operating Systems", U.S. patent application Ser. No.: 09/015,566, Jan. 30, 1998, which is incorporated herein by reference in its entirety.

One advantage of using the DTE task 220 in user mode is that data ports and command ports may be mapped for use in parallel. For example, the command port on a modem may be accessed in terminal mode without interrupting the operation of a data port in data mode. In such an embodiment, the terminal application 30 may execute in terminal mode simultaneously with another application using the modem in data mode. Further information regarding the availability of device driver resources in user mode may be found in U.S. patent application Ser. No. 09/093,837 "System and Method for Communication With a Serial Communications Device Using Multiple Virtual Ports" filed on May 29, 1998, which is incorporated herein by reference.

The modem driver 200 in FIG. 2 utilizes the DTE task 220 to access user level functions via the driver interface 90. The DTE task 220 includes a function call through the driver interface 90 to an application caller 110 executing at the user level. The application caller 110 includes a call to the help system application 50 to execute as a run-time executable application. The help system application 50 starts to execute using a modem help data structure 162. In a preferred embodiment, the modem help data structure 162 is a file in the computer file system.

Figure 3:
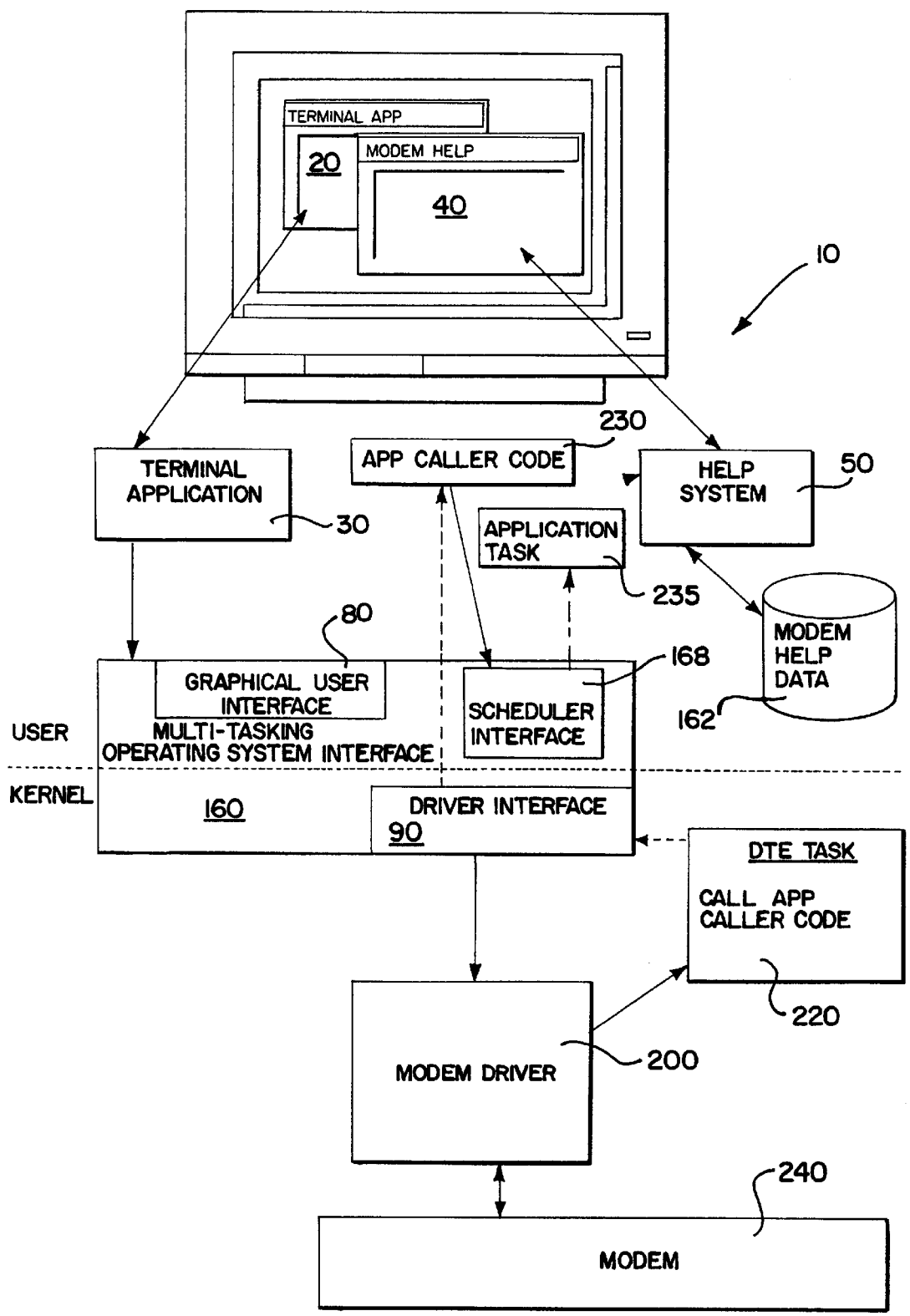
FIG. 3 is a block diagram of an alternative embodiment of the present invention.

Referring to FIG. 3, the modem driver 200 and the DTE task 220 may operate at the kernel level. The modem driver 200 may send commands that it receives to the DTE task 220, which may then access a second application caller 230 via the driver interface 90. The second application caller 230 invokes the help system application 50 by creating and scheduling an application task 235 via the scheduler interface 168. The application task 235 includes a call to a run-time executable that executes the second application 50.

FIG. 4 shows a flow chart of a method for displaying information relating to the modem using a graphical user interface. The method shown in FIG. 4 is preferably performed using the system shown in FIG. 2, however, alternative systems, such as the system shown in FIG. 3 may be used as well.

The method shown in FIG. 4 begins at step 300 at which the DTE task 220 (shown in FIGS. 2 & 3) waits for a device command. The device command is communicated to the DTE task 220 when the modem driver 200 receives the command from an application such as the terminal application 30. When the DTE task 220 receives the device command, it interprets the command at decision block 304. The DTE task 220 tests the command for a help command at decision block 304, however, one of ordinary skill in the art will appreciate that the method in FIG. 4 may be used for any commands requesting information relating to the modem 240.

If the command is not a help command, the DTE task 220 performs other commands at step 308. If the command is the help command, the DTE task 220 invokes the application caller at step 306. The application caller may be the first application caller 110 shown in FIG. 2 or the second application caller shown in FIG. 3. The application caller starts to execute at step 320. The application caller invokes the help system application 50 at step 330 and exits at step 332.

The first application caller 110 is a user level function that makes a request to run the help system application 50 as an executable program via the driver interface 90 (shown in FIGS. 2). The second application caller 230 is invoked from the kernel level. The second application caller 230 schedules the application task 235 to invoke the help system application 50.

The help system application 50 executes at step 340 in FIG. 4. The help system application 50 retrieves the modem help data 162 (shown in FIGS. 2 & 3) at step 342. At step 344, the help system application 50 displays the modem help data 162 in the second application screen 40 (shown in FIGS. 2 & 3).

FIG. 5 shows alternative implementations of program code at 400 for interpreting a help command by the DTE task 220 in the 'c' programming language. The help command is invoked when the user enters a command 'AT$'. The modem driver 200 sends the string to the DTE task 220 where a call is made to the application caller 110 as shown at 402. The code at 400 shows an example of using the VxD standard device interface at 410a–d to access the application caller 110 at the code at 402. A call in the application caller 110 is made to the help system application 50 (shown in FIG. 2) at 402 in FIG. 4 to display the modem help information on the second application screen 40 (shown in FIG. 2). The help system application 50 is preferably configured to access help data from a modem help data 162 in the computer storage system. The advantage of accessing the modem help data 162 from the computer storage system is that a help data may be written for different languages and distributed as software with the device driver. The language of the help information may therefore be provided as a user's choice.

FIG. 5 shows a second example of program code at 404 according to the system described with reference to FIG. 3. In the code at 404, the steps in the second application caller 230 (shown in FIG. 3) include the steps shown at 420. A scheduler call at 430 identifies the help system application and schedules the application task 235 (shown in FIG. 3). The code at 440 is executed in the application task 235 (shown in FIG. 3) to invoke the help system application task 50.

Figure 6A:
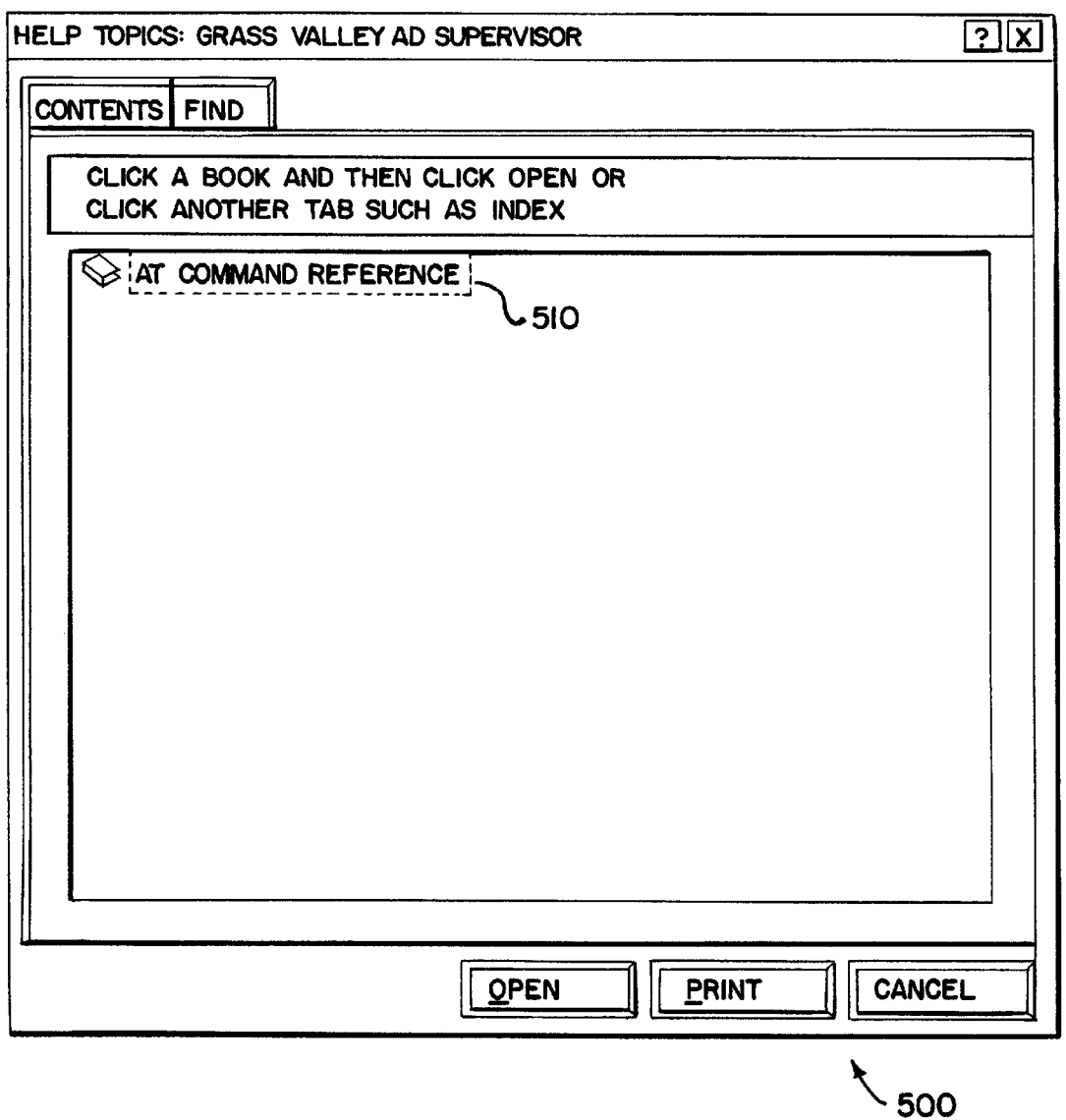

Embodiments of the present invention advantageously display device information, such as help information, in persistent, easy to read application screens. An example of such an application screen is shown in FIG. 6A. The screen in FIG. 6A shows an application screen displayed after entering a Help command at the terminal application screen. The application screen shown in FIG. 6A is independent of the application screen used by the terminal application. The information displayed on the terminal application screen remains displayed after execution of the help command.

Figure 6B:
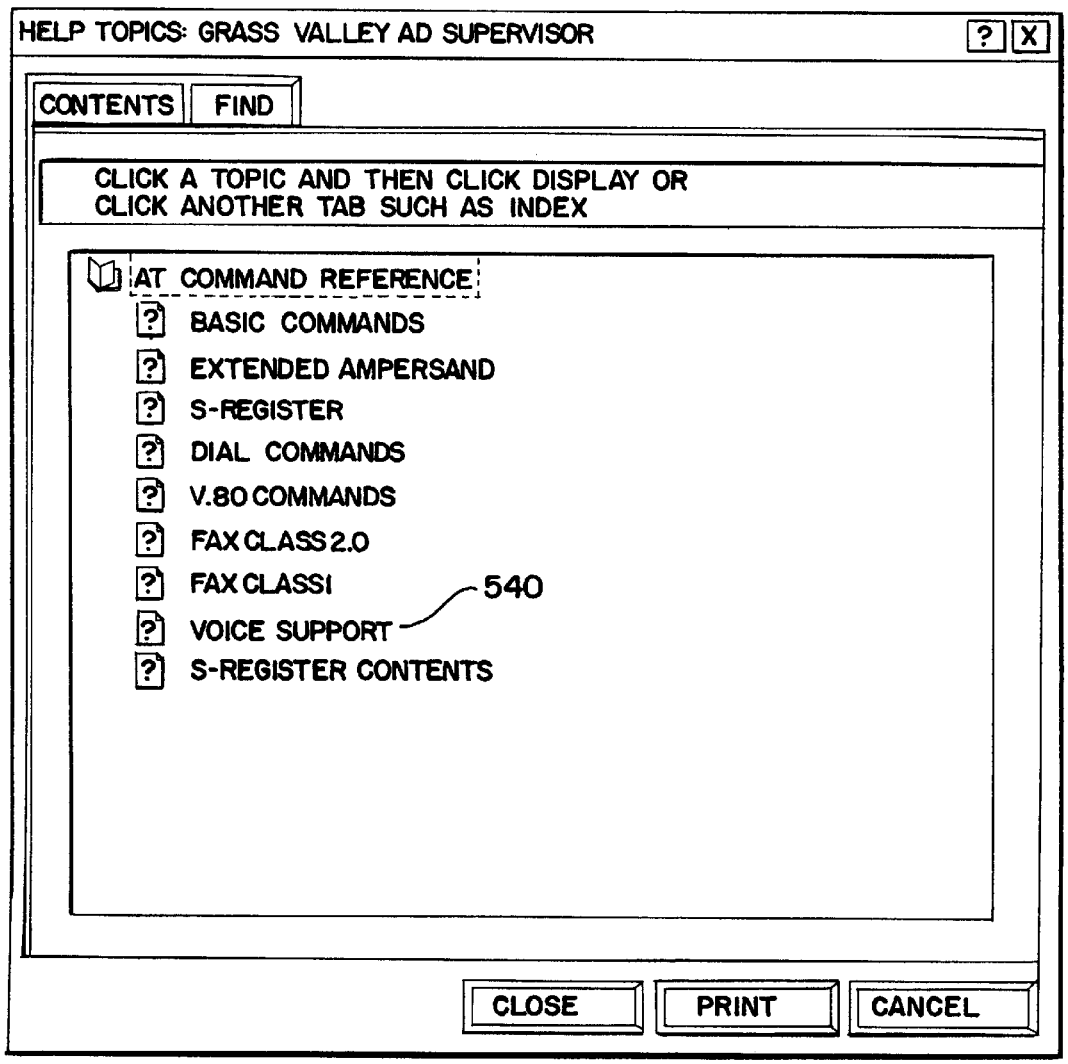
Figure 6C:
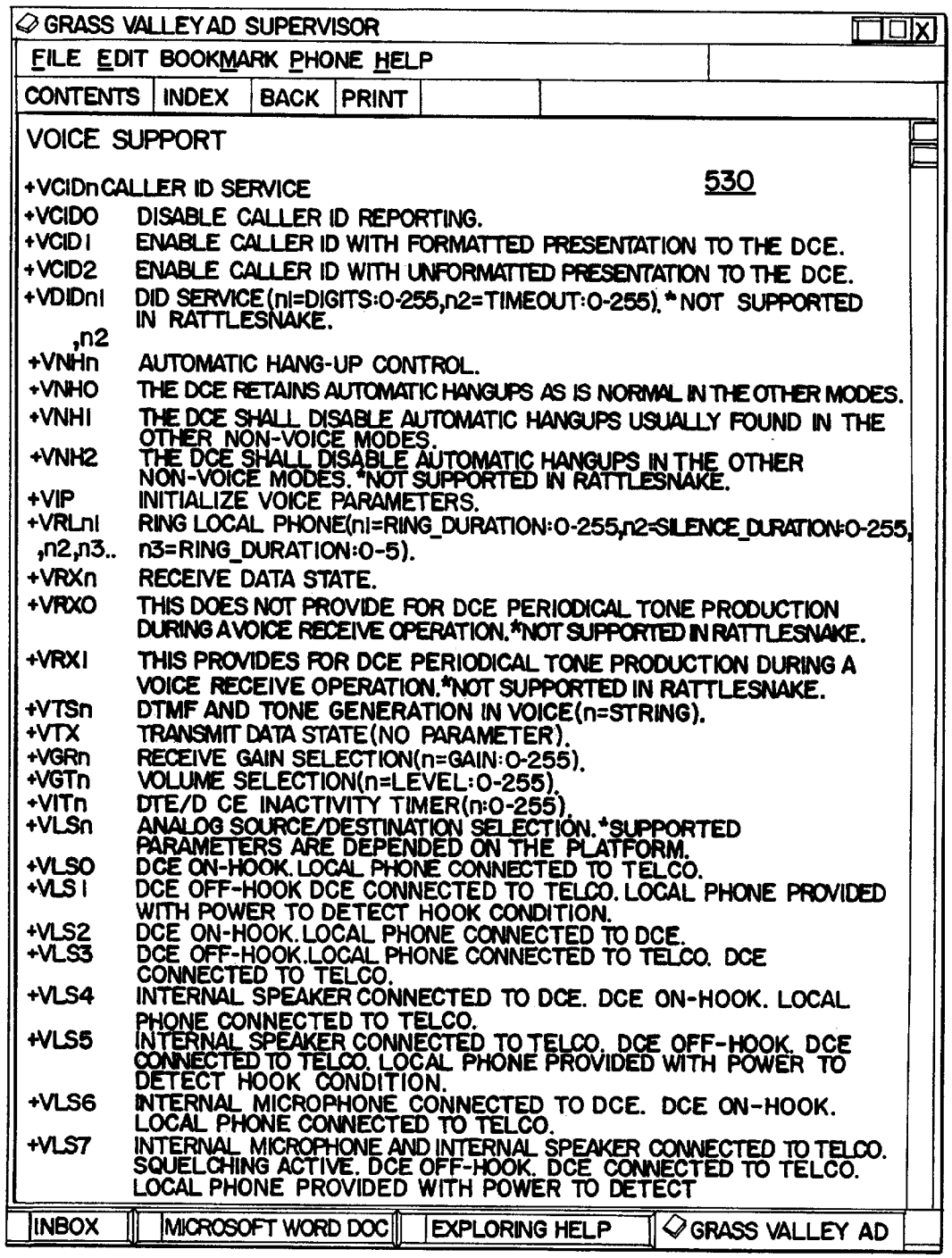

An advantage of the help screen 500 in FIG. 6A is that levels of information may be organized to allow the user to select desired topics by clicking on the screen. FIG. 6B shows a second screen 520 displayed after clicking on a highlighted line at 510 on the screen 500 in FIG. 6A. A third screen 530 is shown in FIG. 6C which is an example of the display after clicking on an item 540 on the second screen 520 in FIG. 6B.

For the sake of comparison, FIG. 6D shows an example of a terminal application screen displayed after entering a Help command using a known modem.

It is to be understood by those of ordinary skill in the art that the code shown in FIG. 5 represents one example of an implementation of a system and method for displaying information relating to a device using a graphical user interface. Other implementations using different programming languages, operating systems, tools, devices, and a driver interfaces may be used in the present invention.

While the invention has been described in conjunction with presently preferred embodiments of the invention, persons of skill in the art will appreciate that variations may be made without departure from the scope and spirit of the invention. This true scope and spirit is defined by the appended claims, interpreted in light of the foregoing.

I claim:

1. A system in a computer for displaying information from a device on a display screen, the system comprising:
    a multitasking operating system for providing computing resources to application programs, the multitasking operating system having a scheduler and a graphical user interface, the scheduler being operable to schedule a plurality of tasks for execution using the multitasking operating system, the graphical user interface being operable to display a plurality of application screens on the display screen;
    a device interface for providing a program access to the device;
    a first application for sending a device data request to the device interface for requesting device data for display on the display screen;
    a device driver coupled to the device interface for receiving the device data request from the first application, the device driver being operable to start a device command task for processing a plurality of device commands including the device data request; and
    a second application called by the device command task in response to the device data request, the second application being operable to send the device data to one of the plurality of application screens.

2. A system as claimed in claim 1 wherein the device is a modem.

3. A system as claimed in claim 1 wherein the second application is a help system for displaying a plurality of help messages about a plurality of topics relating to the computer.

4. A system as claimed in claim 1 wherein the device data sent by the second application to the one of the plurality of application screens is modem help data.

5. A system as claimed in claim 1 wherein the multitasking operating system is the Windows™ operating system.

6. A system as claimed in claim 1 wherein the second application includes the Window™ Help system.

7. A system as claimed in claim 6 wherein the device data sent by the second application to the one of the plurality of application screens is modem help data stored in a modem help file.

8. A system as claimed in claim 1 wherein the first application includes a command line for receiving device commands from the user entering the device commands at a keyboard.

9. A system as claimed in claim 1 wherein the second application is launched by an application task created at a kernel level by the device command task.

10. A system as claimed in claim 1 wherein the second application is launched by a user level request to run the second application.

11. A system as claimed in claim 1 wherein the driver interface is the Virtual Driver Interface™.

12. An improved modem operable to communicate with a computer having a display screen, a multitasking operating system for providing computing resources to application programs, a device interface for providing a program access to the device, a first application and a second application, the multi-tasking operating system having a scheduler and a graphical user interface, the scheduler being operable to schedule a plurality of tasks for execution using the multi-tasking operating system, the graphical user interface being operable to display a plurality of application screens on the display screen, the first application being operable to send a device data request to the device interface for requesting device data for display on the display screen, the second application being operable to send data from a data file to one of the plurality of application screens, the improvement comprising:
    a device driver coupled to the device interface for receiving the device data request from the first application, the device driver being operable to start a data terminal equipment (DTE) task for processing a plurality of device commands including the device data request;
    a modem data file comprising the device data; and
    the DTE task including a program call for starting the second application,
wherein the second application displays the device data by accessing the modem data file and displaying the device data in the modem data file on the one of the plurality of application screens.

13. A system as claimed in claim 12 wherein the second application is a help system and wherein the modem data file includes a plurality of help messages about a plurality of topics relating to the modem.

14. A system as claimed in claim 12 further comprising an application task created at a kernel level by the DTE task, the application task having an application call to the second application.

15. A system as claimed in claim 12 wherein the DTE task comprises an application call at a user level to the second application.

16. A system as claimed in claim 12 wherein:
    the multitasking operating system is the Windows™ operating system;
    the second application is the Windows™ Help system; and
    the modem data file conforms to the Windows™ Help system.

17. A system as claimed in claim 12 wherein the driver interface is the Virtual Driver Interface™.

18. In a system having a device connected to a computer having a multitasking operating system having a scheduler for scheduling tasks, a driver interface for providing access to the device, and a graphical user interface to display a plurality of application screens on a display screen on a display terminal, a method for displaying data from the device comprising the steps of:
    receiving a device command at a first application, the device command being a request for device information;
    sending the device command via the driver interface to a device command task;
    interpreting the command at the device command task;
    calling a second application at the device command task;
    the second application displaying an application screen; and
    the second application retrieving and displaying device data in response to the device command.

19. A method as claimed in claim 18 wherein the step of calling the second application comprises the steps of:
    creating an application task at a kernel level; and
    calling the second application from the application task.

20. A method as claimed in claim 18 wherein the step of calling the second application comprises the step of calling the second application at a user level from the device command task.

* * * * *